US005178254A

United States Patent [19]

Saito et al.

[11] Patent Number: 5,178,254

[45] Date of Patent: Jan. 12, 1993

[54] PASSENGER CONVEYOR

[75] Inventors: Chuichi Saito, Katsuta; Masao Takizawa, Mito; Kazuhira Ojima, Kasama; Yoozi Inanobe, Katsuta; Akihiro Sato, Naka; Minoru Onodera, Mito, all of Japan

[73] Assignee: Hitachi, Ltd., Tokyo, Japan

[21] Appl. No.: 564,072

[22] Filed: Aug. 8, 1990

[30] Foreign Application Priority Data

Aug. 25, 1989 [JP] Japan ................................ 1-217363

[51] Int. Cl.[5] ............................................ B65G 43/00

[52] U.S. Cl. .................................. 198/323; 198/333; 198/335

[58] Field of Search ............... 198/324, 326, 332, 333, 198/335, 323

[56] References Cited

U.S. PATENT DOCUMENTS 1,015,406 1/1912 Seeberger ....................... 198/332 X
3,685,635 8/1972 Johnson .
4,726,463 2/1988 Babler .

FOREIGN PATENT DOCUMENTS 2314120 9/1974 Fed. Rep. of Germany ...... 198/326
50-33598 10/1975 Japan .
0794954 5/1958 United Kingdom .
2137580 10/1984 United Kingdom .

*Primary Examiner*—D. Glenn Dayoan
*Assistant Examiner*—Tuan N. Nguyen
*Attorney, Agent, or Firm*—Antonelli, Terry, Stout & Kraus

[57] ABSTRACT

A passenger conveyor, such as an escalator or a moving walkway, in which a device for transmitting a change of direction of the movement of treadboards to a passenger by changing the passenger's sense of touch is provided in the vicinity of a boundary between a horizontal path and an inclined path. With this construction, a level difference between the adjacent treadboards is produced when the treadboard moves into the inclined path, thereby preventing the passenger from accidentally falling down.

17 Claims, 11 Drawing Sheets

FIG. I

PASSENGER CONVEYOR

BACKGROUND OF THE INVENTION

This invention relates generally to a passenger conveyor such as an escalator and a moving walkway, and, more particularly, to a passenger conveyor having a horizontal path along which treadboards move in a horizontal direction provided between inclined paths or a passenger conveyor having an inclined path provided between horizontal paths.

A conventional passenger conveyor is disclosed in, for example, Japanese Patent Publication No. 50-33598, in which a horizontal path along which treadboards move in a horizontal direction is provided between inclined paths along which the treadboards move in an inclined direction.

In this conventional passenger conveyor, when the treadboard moves from the horizontal path to the inclined path, a level difference between the adjacent treadboards suddenly develops, and therefore there is a great possibility that the passenger standing astride the boundary between the adjacent treadboards may fall down because of this level difference. In this connection, when the passenger conveyor ascends, the treadboard shifted from the horizontal path to the inclined path is raised, and when the passenger conveyor descends, the treadboard shifted from the horizontal path to the inclined path is lowered. This phenomenon occurs due to the fact that the passenger properly standing at the inclined path tends to walk or move unintentionally at the horizontal path. Therefore, from the viewpoint of safety, it is important to keep the passengers from moving particularly at the horizontal path.

It has been proposed to provide caution sign lamps or an information broadcasting installation so as to caution the passengers against moving when they shift from the horizontal path to the inclined path. However, the arousing of the passengers' attention by such caution sign lamps and such information broadcasting installation is almost useless when the passengers are unattentive or distracted.

Another conventional passenger conveyor is proposed in for example, U.S. Pat. No. 3,685,635, where pallets of the conveyor are upwardly and downwardly vibrated near an exit so as to inform the passengers that they are coming near the exit.

SUMMARY OF THE INVENTION

It is an object of this invention to provide a passenger conveyor which can inform the passengers of a change of the direction of movement of the conveyor.

Another object of the invention is to provide a passenger conveyor which can keep the passengers from moving along a horizontal path in the vicinity of a boundary between the horizontal path and an inclined path.

A further object of the invention is to provide a passenger conveyor which can keep the passenger in the proper position at the horizontal path and in the vicinity of the boundary between the horizontal path and the inclined path.

To achieve the above objects, in the present invention, means are provided for changing a passenger's sense of touch in the vicinity of the boundary between the horizontal path and the inclined path. Also, there means are provided for preventing the passenger from standing astride the boundary between the adjacent treadboards before the treadboards reach the inclined path.

With the above construction, the attention of the distracted or unattentive passenger is aroused by changing his sense of touch, so that when the direction of movement of the treadboards is changed, the passenger can deal with this change easily, thereby preventing the passenger from falling down due to the change of the direction of movement of the treadboards.

DESCRIPTION OF THE PREFERRED EMBODIMENT OF THE INVENTION

Figure 1:
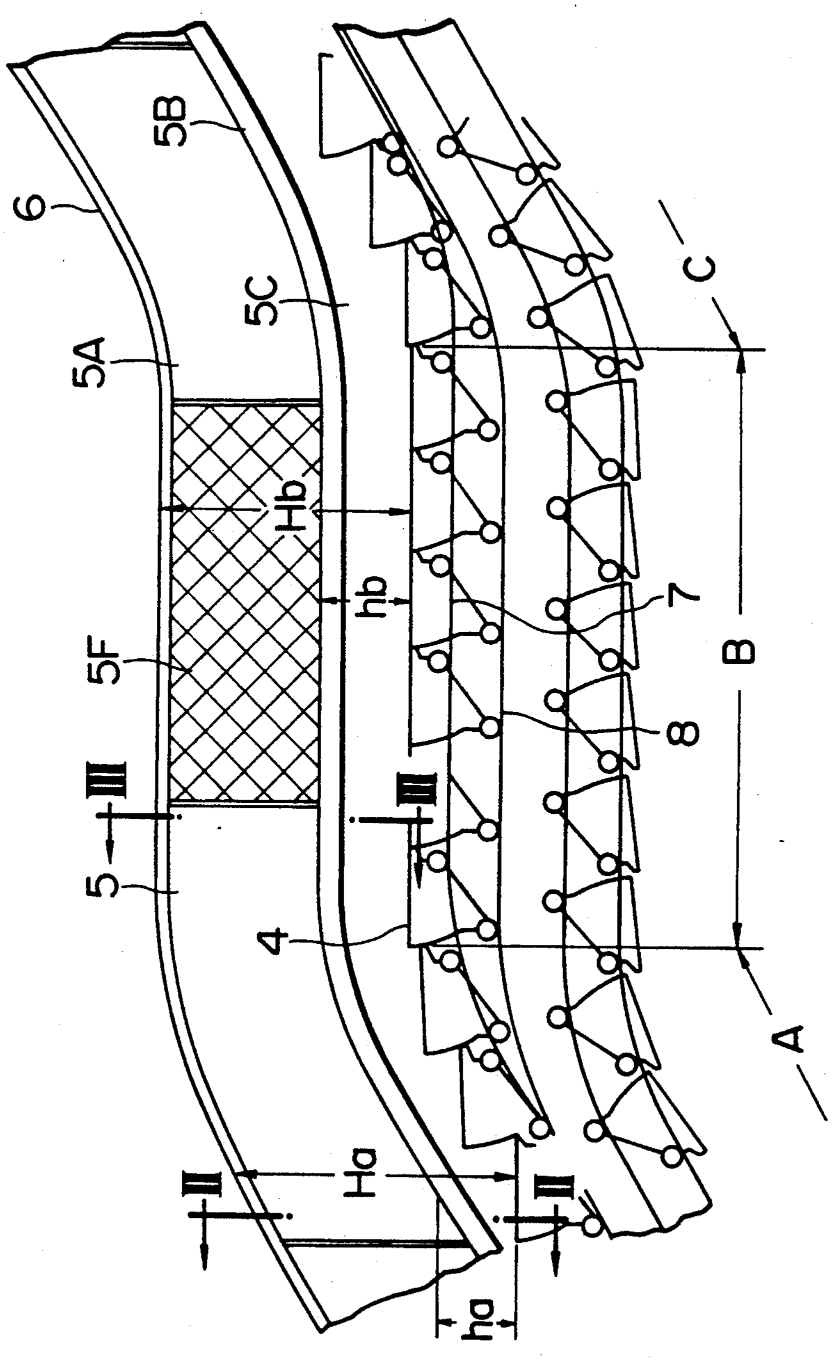
FIG. 1 is a side-elevational view of a portion of a passenger conveyor provided in accordance with the present invention.

One preferred embodiment of the present invention will now be described with reference to FIGS. 1 to 4. Here, the invention is embodied in a so-called intermediate horizontal-type escalator having a horizontal path between inclined paths. FIG. 4 shows the overall construction of this escalator, and a body frame 3 extends between one entrance/exit 1 and another entrance/exit 2. Movable treadboards 4, interconnected in an endless manner, are supported on the body frame 3, and a pair of upstanding balustrades 5, provided respectively on the opposite sides of the treadboards 4, are also supported on the body frame 3. A handrail 6 is supported on the peripheral edge of each of the balustrades 5 through a guide member 5E, with the handrail 6 being movable in synchronism with the treadboards 4. In this construction, the treadboards 4 are guided by guide rails 7 and 8 mounted on the body frame 3 so that the treadboards 4 can move continuously along two inclined paths A and C and a horizontal path B provided between the two inclined paths A and C. The body frame 3 as well as the balustrades 5 have a configuration conforming to the configuration of the continuous path constituted by the two inclined paths A and C and the horizontal path B. With the provision of the horizontal path B between the inclined paths A and C, when the passenger M, intending to descend, is to get on the escalator, the downwardly-directed gaze (eyes) Mm of the passenger M is intercepted by the horizontal path B, so that the passenger M can not see the lower exit 1, thus causing the passenger M to feel easy or safe.

Figure 2:
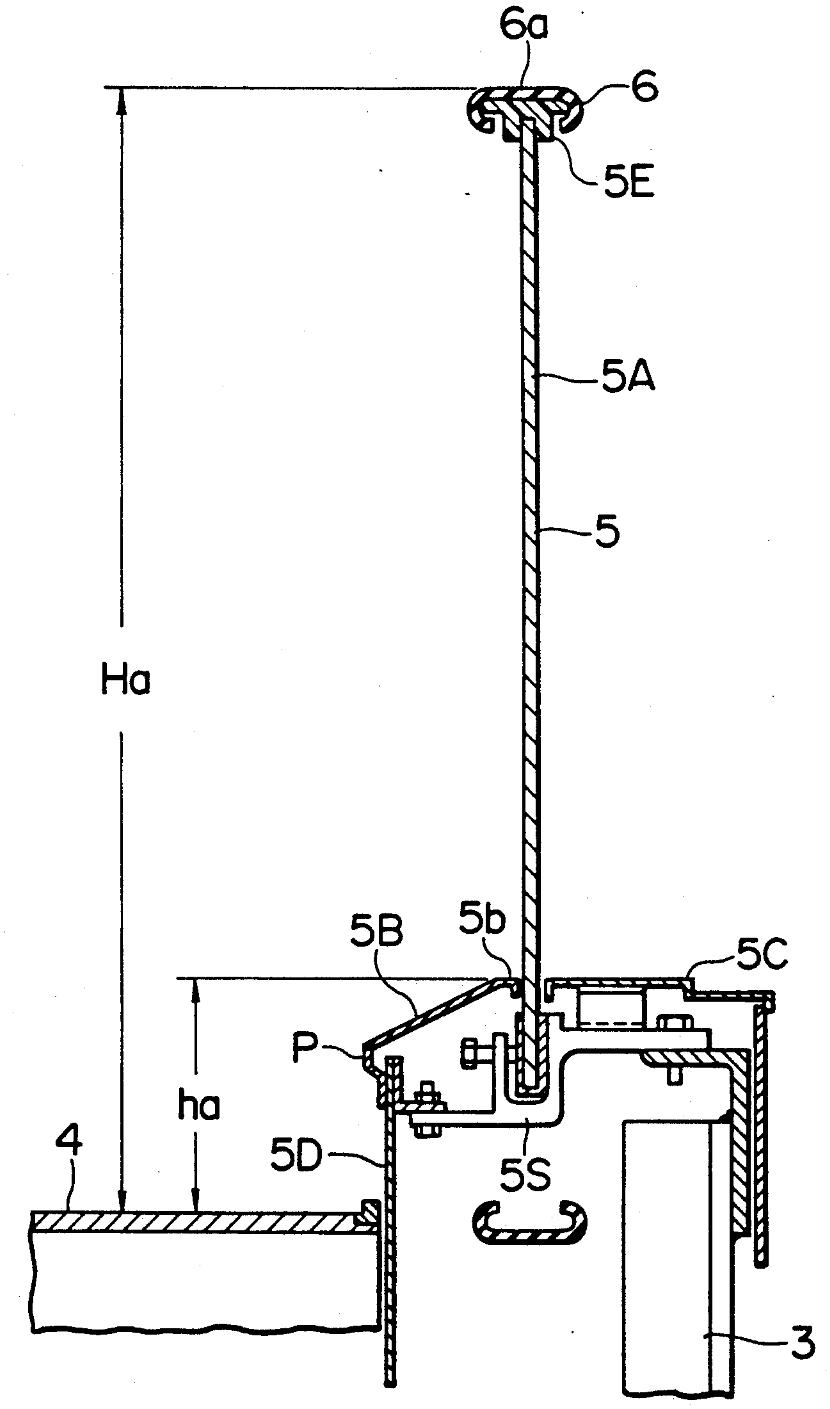
FIG. 2 is an enlarged cross-sectional view 1 taken along the line II—II of FIG. 1.
Figure 3:
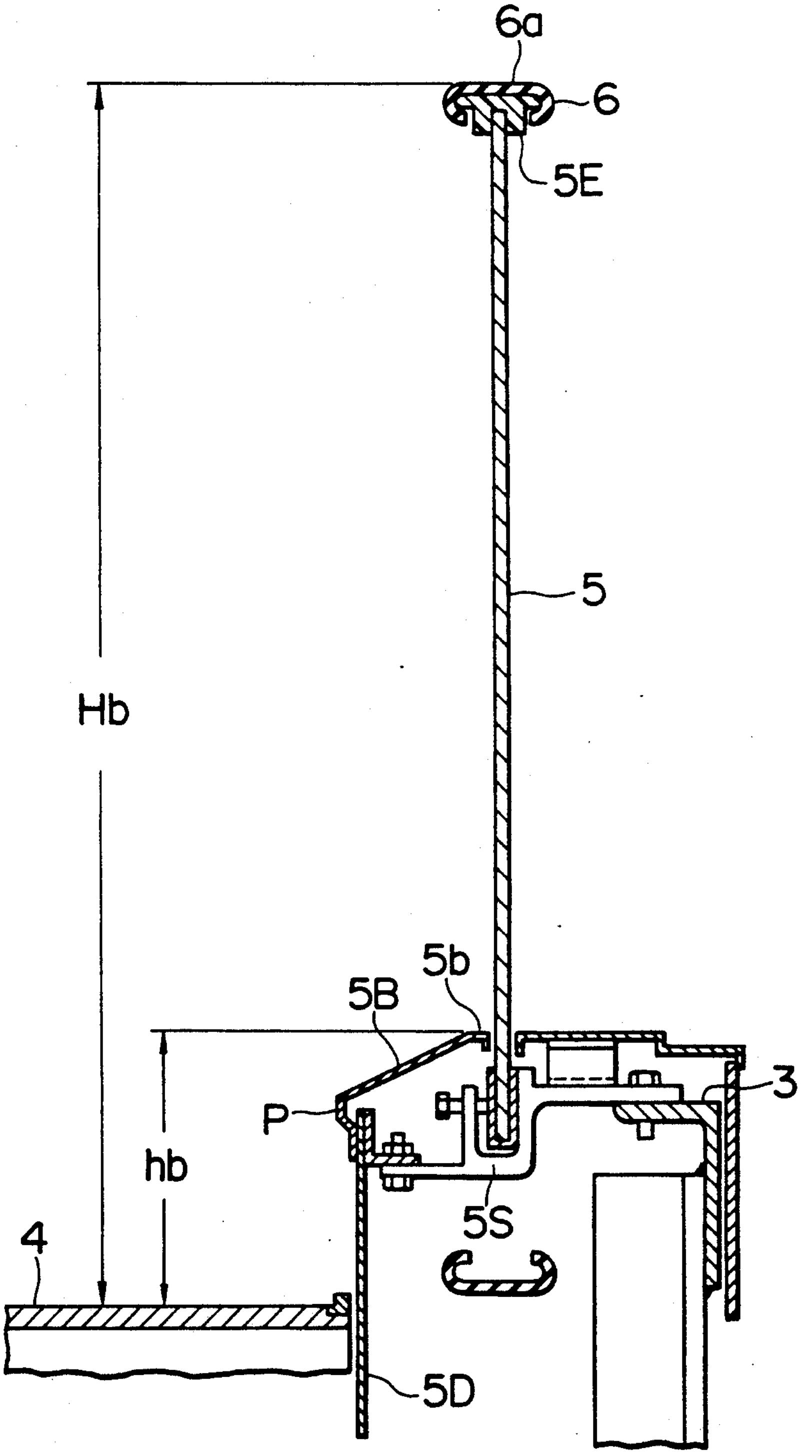
FIG. 3 is an enlarged cross-sectional view taken along the line III—III of FIG. 1.
Figure 4:
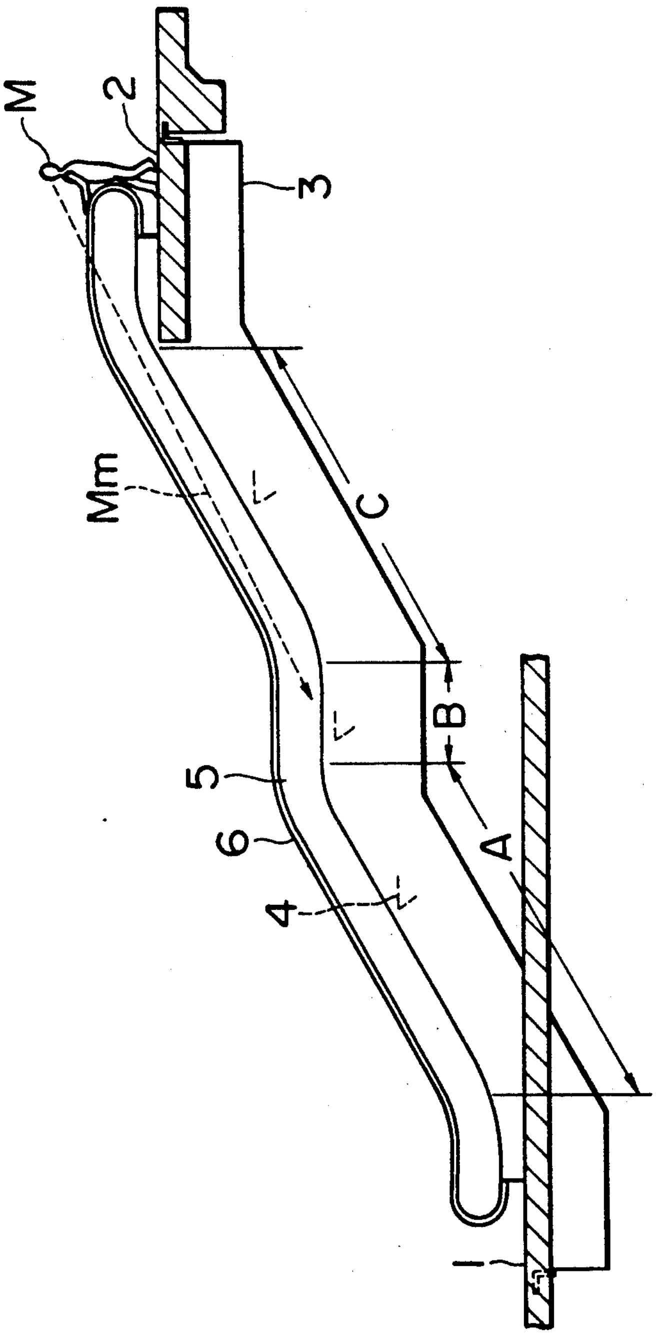
FIG. 4 is a side-elevational view of the overall construction of the passenger conveyor.

As shown in FIGS. 1 to 3, the balustrade 5 comprises a balustrade panel 5A, an inner deck cover 5B and an outer deck cover 5C which cover the lower end portion of the balustrade panel 5A, and a skirt guard 5D. These parts are supported on the sturdy body frame 3 through a mounting member 5S. Thus, the balustrade 5 has the balustrade panel 5A which is made usually of tempered glass and, in some cases, of a steel plate. A vertical height Ha (FIG. 2) from the central portion of the treadboard 4 to an upper surface 6*a* of the handrail 6 at the inclined path A, C is less than a vertical height Hb (FIG. 3) from the central portion of the treadboard 4 to the upper surface 6*a* of the handrail 6 at the horizontal path B ($Ha<Hb$). The difference between the height Ha and the height Hb changes the height of the hand of the passenger M holding the handrail 6, and therefore changes the passenger's sense of touch to give a stimulus to the passenger M, thereby causing the passenger M to feel a difference between the inclined path A, C and the horizontal path B, and at the same time because of a difference of the area of the balustrade panel 5A, the passenger M is caused to visually feel this dimensional difference. At the horizontal path B, the passenger M feels a sense of difference because of change in the sense of touch, and the passenger M braces himself because of this sense of difference, and stops a useless motion at the horizontal path B. This can prevent an accident, such as the falling-down resulting from the standing astride the boundary between the adjacent treadboards 4, when the treadboard 4 shifts from the horizontal path B to the inclined path A or C. Similarly, a vertical height ha from the treadboard 4 to an upper surface 5*b* of the inner deck cover 5B at the inclined path A, C is less than a vertical height hb from the treadboard 4 to the upper surface 5*b* of the inner deck cover 5B at the horizontal path B ($ha<hb$). This provides a visual recognition, and also gives a stimulus to the passenger M with his foot held in contact with a side end P of the inner deck cover 5B, by moving this contact point in a vertical direction (that is, by causing the foot to rub the inner deck due to the difference between the height ha and the height hb). In the above construction, although the relationship between the vertical heights of the handrail 6 and the relation between the vertical heights of the inner deck B are $Ha<Hb$ and $ha<hb$, respectively, these relationship may be reversed (that is, $Ha>Hb$ and $ha>hb$), and also the height of the handrail 6 and the height of the inner deck 5B may be suitably changed in the range of the horizontal path B.

Further, the balustrade panel 5A of FIG. 1 has a striped pattern 5F provided in the range of the horizontal path B. This striped pattern 5F is formed by coloring or patterning through printing or a film-bonding. The striped pattern 5F serves to cause the passenger M to visually recognize the difference of the horizontal path B from the inclined path A, C. The striped pattern 5F, when used in combination with the above means for changing the sense of touch, is effective.

Figure 5:
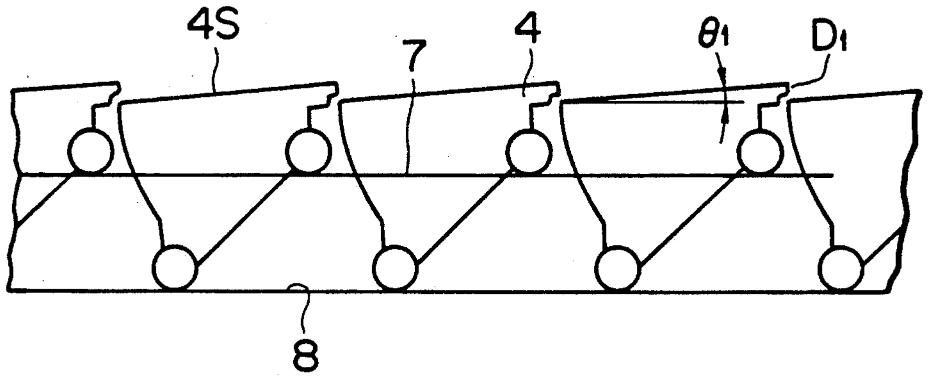
FIGS. 5 and 6 are enlarged side-elevational views of a portion of the passenger conveyor, showing the manner of movement of treadboards, respectively.
Figure 6:
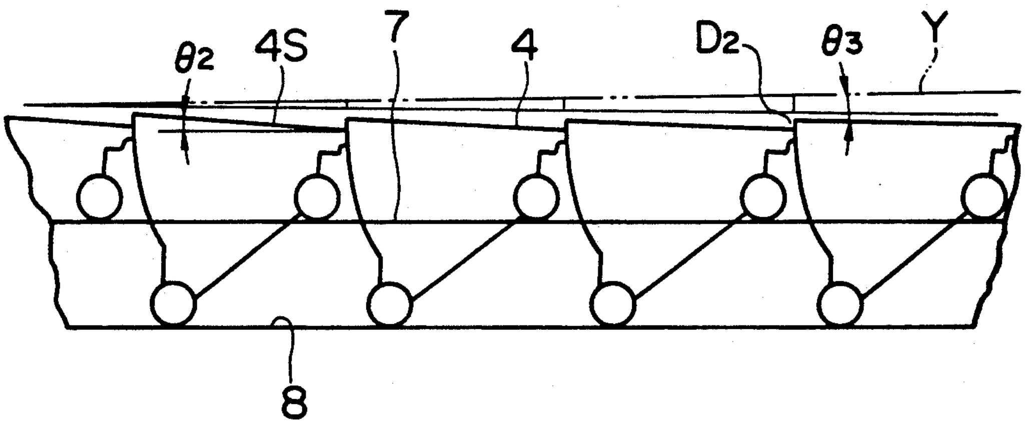

Reference is now made to means for informing the passenger M of a change of the direction of movement of the treadboards 4 and for instructing the passenger M not to stand astride the boundary between the adjacent treadboards 4 at the horizontal path B, such means being provided on the part of the treadboards 4. In FIG. 5, the treadboards 4 are guided by the guide rails 7 and 8 in such a manner that a tread surface 4S of each treadboard 4 at the horizontal path B is inclined at an angle $\theta$ with the right end (FIG. 5) of the tread surface raised, thereby providing a level difference $D_1$ between the adjacent treadboards 4. In FIG. 6, the treadboards 4 are guided by the guide rails 7 and 8 in such a manner that the tread surface 4S of each treadboard 4 at the horizontal path B is inclined at an angle $\theta_2$ with the left end (FIG. 6) of the raised, thereby providing a level difference $D_2$ between the adjacent treadboards 4. These level difference $D_1$ and $D_2$ stimulate the sole of the shoe of the passenger M to change the sense of touch, and therefore these level differences are effective in keeping the passenger M from moving on the treadboards 4 and also in drawing the attention of the passenger M to the fact that the passenger M is astride the boundary between the adjacent treadboards 4. The inclinations $\theta_1$ and $\theta_2$ are intended to incline the posture of the passenger M toward the direction of inclination of the treadboard 4, thereby making it difficult for the passenger M to move on the treadboards 4. Alternatively, a continuous plane constituted by the tread surfaces 4S at the horizontal path B is inclined at an angle $\theta_3$ as indicated by a dot-and-dash line in FIG. 6. In any of these examples, the treadboards 4 move along the upper surfaces of the guide rails 7 and 8.

Figure 7:
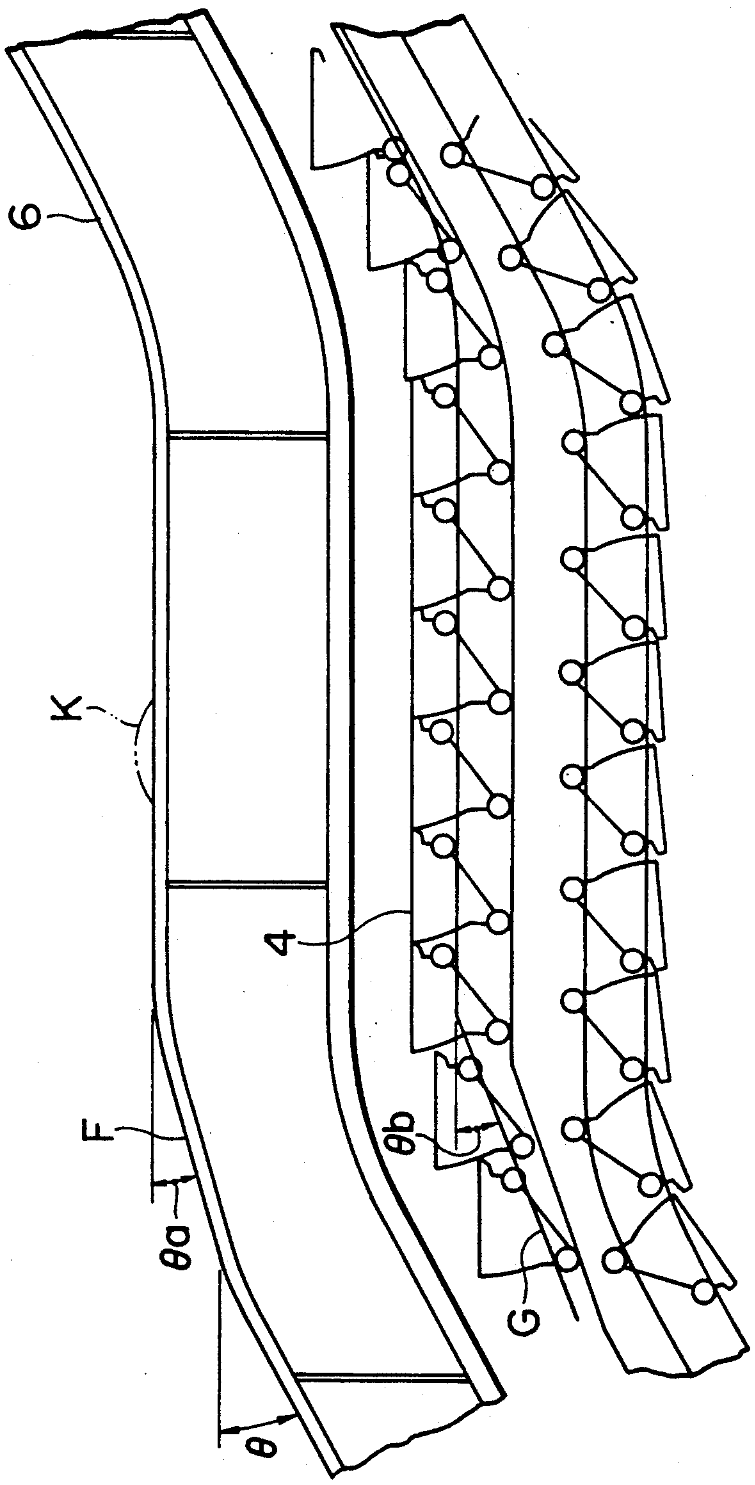
FIG. 7 is a view similar to FIG. 1, of a modified passenger conveyor in accordance with the present invention.

FIG. 7 shows an example in which the path of travel of each handrail 6 has an additionally second inclined path F disposed between the inclined path A and the horizontal path B, with the second inclined path F having an inclination angle $\theta_2$ different from the inclination angle 8 of the inclined path A. In this case, the path of travel of the treadboards 4 also has a second inclined path G of a similar construction having an inclination angle $\theta_b$. The change from the horizontal path B to the second inclined paths F and G can be visually recognized, and also gives a stimulus to the hand and feet of the passenger, thus giving a sufficient tension to the passenger. The second inclined paths F and G may be provided between the inclined path C and the horizontal path B. Reference character K in FIG. 7 shows a raised condition of part of the moving handrail 6, and the handrail 6 is partially raised when the handrail 6 passes over a projection (not shown) formed on the guide member 5E for the handrail 6. With this arrangement, also, a stimulus is given to the hand of the passenger to arouse his attention. Thus, the upward and downward movement of the handrail 6 due to the raising thereof gives a sense of difference to the hand, and therefore is effective in causing the passenger to recognize the difference between the inclined path A and the horizontal path B.

Figure 8:
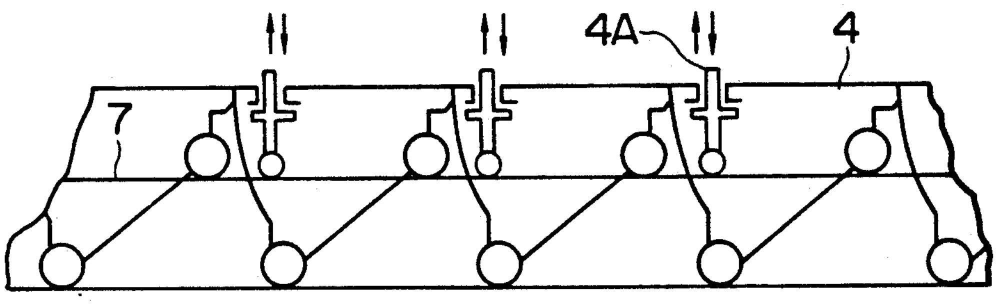
FIG. 8 is a side-elevational view of the treadboard portion.
Figure 9:
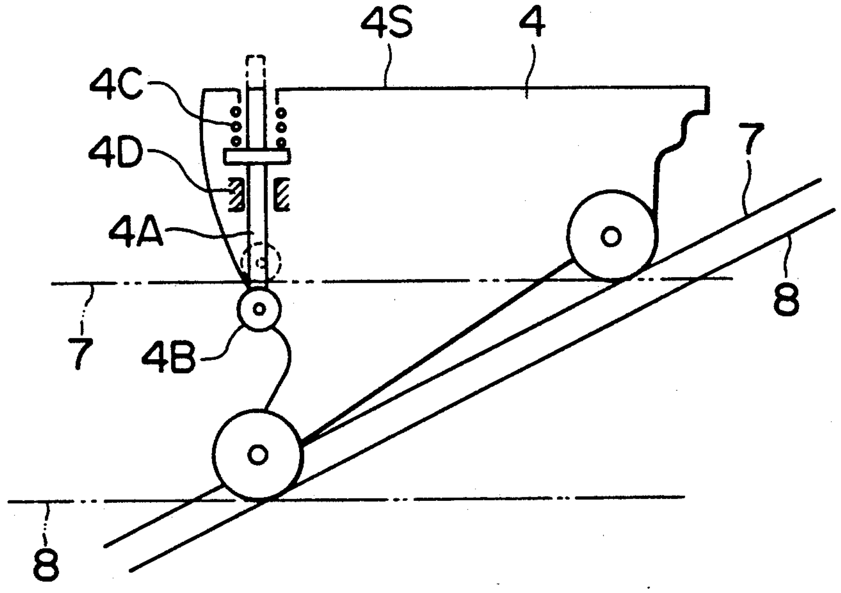
FIG. 9 is a detail view of FIG. 8.

FIG. 8 shows an example in which caution members 4A are provided so as to move upwardly and downwardly, so that the caution members 4A can project upward beyond the tread surfaces 4S of the treadboards 4. For example, the caution member 4A is provided at the boundary between the adjacent treadboards 4, and is projected when the treadboards 4 move into the horizontal path. Therefore, if the foot of the passenger is astride the boundary between the adjacent treadboards 4, the projected caution member 4A pushes the foot to give a stimulus thereto, thereby arousing the attention of the passenger. The projection of the caution members 4A also serves to keep the passenger from moving at the horizontal path B. As shown in FIG. 9, the caution member 4A is guided by a guide member 4D, mounted inwardly of the treadboards 4, so as to be moved vertically. When the treadboards 4 move along the inclined paths A and C, the upper end of the caution member 4A is held flush with the tread surfaces 4S by a spring 4C, and the lower end of the caution member 4A is spaced apart from the guide rails 7 and 8. However, when the treadboards 4 move into the horizontal path B, with the guide rails 7 and 8 rendered horizontal as indicated by a dot-and-dash line, a roller 4B mounted on the lower end of the caution member 4A is brought into contact with the guide rail 7, so that the entire caution member 4A is raised, and, as a result, the upper end of the caution member 4A is projected beyond the tread surfaces 4S.

Figure 10:
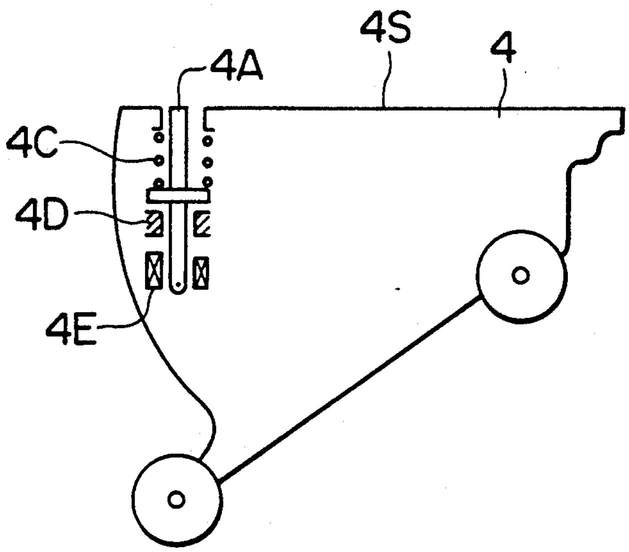
FIG. 10 is view similar to FIG. 9 of a modified form of the invention.

Although in the above embodiment, the caution member 4A is raised utilizing the guide rail 7, the caution member 4A may be driven by an electromagnetic coil 4E (FIG. 10) to be moved upwardly and downwardly. More specifically, as shown in FIG. 9, the caution member 4A is guided by a guide member 4D, mounted inwardly of the treadboards 4, so as to be moved vertically, and, when the treadboards 4 move along the inclined paths A and C, the upper end of the caution member 4A is held flush with the tread surfaces 4S by a spring 4C. However, when the treadboards 4 move into the horizontal path B, the electromagnetic coil 4E is supplied with current to produce electromagnetic force. This electromagnetic force acts on the lower portion of the caution member 4A to drive the caution member 4A to move upwardly, so that the upper end of the caution member 4A is projected beyond the tread surfaces 4S. The electromagnetic coil 4C may be kept in an energized condition at the inclined paths A and C, in which case the electromagnetic coil 4C is de-energized at the horizontal path B, thereby moving the caution member 4A upwardly under the influence of the spring 4c. The electromagnetic coil 4E may be replaced by any other suitable drive device, such as a motor and a hydraulic mechanism.

Figure 11:
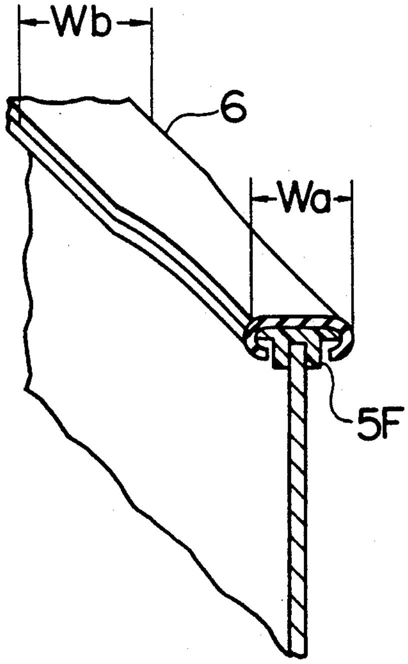
FIG. 11 is a fragmentary, perspective view of a modified handrail in accordance with the present invention.

FIG. 11 shows an example in which the height of the handrail 6 (i.e., the height from the treadboard 4 to the upper surface of the handrail 6) is equal at all of the inclined paths A and C and the horizontal path B, and a width Wa of the handrail 6 at the inclined path is increased to a width Wb at the horizontal path B. This dimensional change is obtained by changing the width of the guide rail 5E along the length thereof which is fixedly mounted on the upper end of the balustrade panel 5A. By changing the width of the handrail 6 from Wa to Wb, a stimulus is given to the hand of the passenger, thereby arousing the attention of the passenger.

Figure 12:
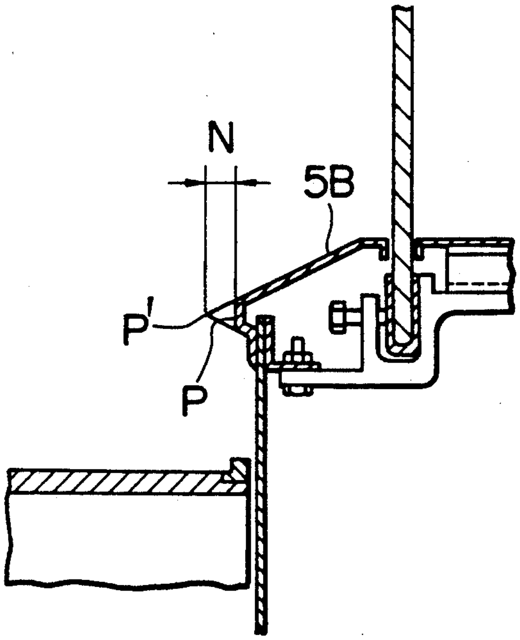
FIG. 12 is a fragmentary, cross-sectional view of a modified inner deck cover in accordance with the present invention.

In an example shown in FIG. 12, at the horizontal path B, the side end P' of the inner deck cover 5B is laterally projected by a distance N, and this side end P' is brought into contact with the passenger near his foot, thereby informing the passenger of a change of the direction of movement through such sense of contact.

Figure 13:
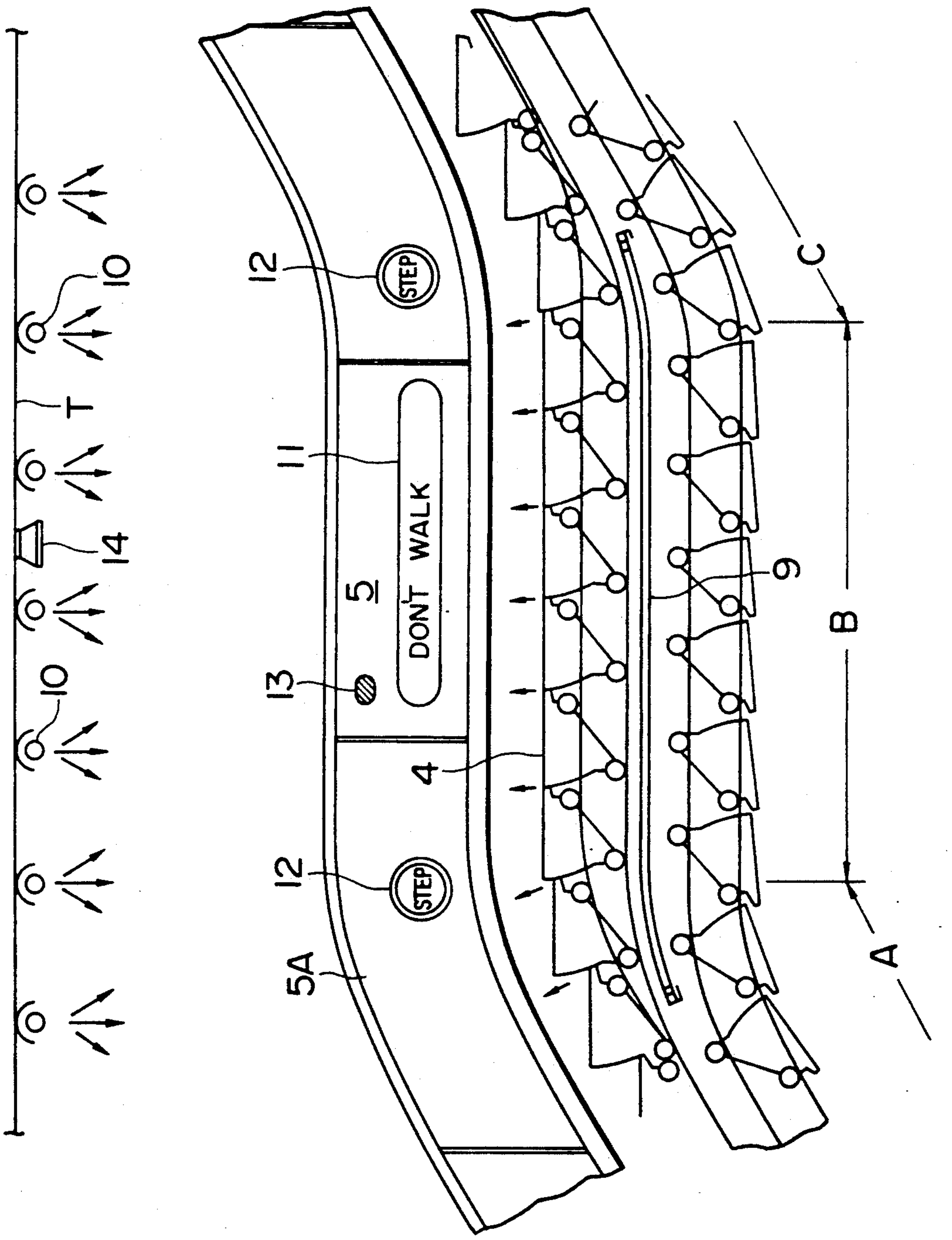
FIG. 13 is a view similar to FIG. 1 of another modified form of the invention.

FIG. 13 shows an example in which a change of the direction of movement of the treadboards 4 is announced by an illumination device, sign members and a broadcasting device. At the horizontal path B, the illumination device 9 is provided below the treadboards 4 on the advancing side, and illumination light of this illumination device 9 leaks through gaps between the adjacent treadboards 4 as indicated by arrows, thereby drawing the attention of the passenger. Preferably, the color tone of the illumination light of the illumination device 9 is different from the color tone of illumination light of an illumination device usually provided at the entrance/exit of the escalator for drawing the attention when getting on and off the escalator. By doing so, the attention of the passenger can be better drawn, and the passenger can better recognize the difference of the horizontal path B from the inclined paths A and C.

Further, illumination devices 10, which emit light different in color from light emitted from other regions, can be provided on a ceiling T disposed in opposed relation to the horizontal path B, thereby drawing the attention of the passenger. Although the color tone of the light of the illumination devices 10 may be the same as or different from that of the light of the other regions, the illumination purpose may be changed from that of the other regions by changing the number of the illumination devices 10 or by flashing the illumination devices 10. Reference numerals 11 and 12 denote sign members such as stickers. The sign members 11 and 12 are bonded to the balustrade panel 5A for the same purpose as that of the striped pattern 5F of FIG. 1. The sign member 11 bonded to the balustrade panel 5A at the horizontal path B is indicative of prohibiting of walking, and the sign members 12 bonded to the balustrade panel 5A in the vicinity of the boundaries between the horizontal path B and the inclined paths A and C are indicative of development of a level difference. If the effect achieved by the illumination devices 9 and 10 and the sign members 11 and 12 is limited particularly when the escalator is crowded, the broadcasting devices 13 and 14 may be provided to draw the attention of the passengers. These means, when used in combination with the above means for changing the passenger's sense of touch, more effectively draw the attention of the passengers.

Figure 14:
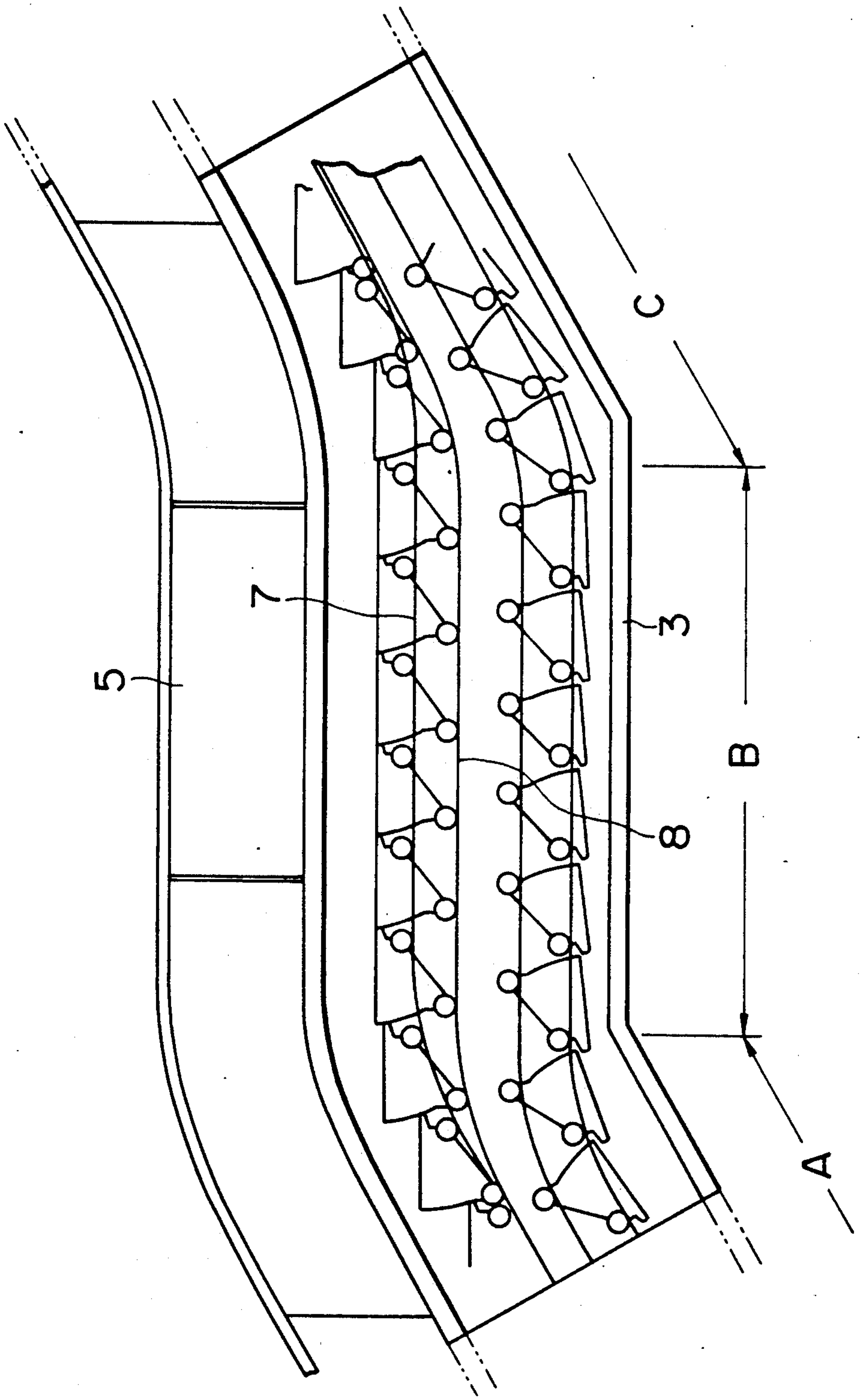
FIG. 14 is a view similar to FIG. 1 of a further modified form of the invention.

FIG. 14 shows an example in which a portion of the body frame 3 extending between portions of the inclined paths A and C, corresponding portions of the guide rails 7 and 8 and at least one of the above means for changing the passenger's sense of touch are combined together to provide a unit. Thus, by forming a portion of the escalator by this unit, the other portions of the escalator can be formed by parts used in an ordinary escalator. Namely, the ordinary escalator has an inclined path which is formed by a plurality of divided inclined path portions, and therefore by connecting the above unit to this divided path portion, there can be easily obtained the intermediate horizontal-type escalator provided with the means for drawing the attention of the passenger.

Figure 15:
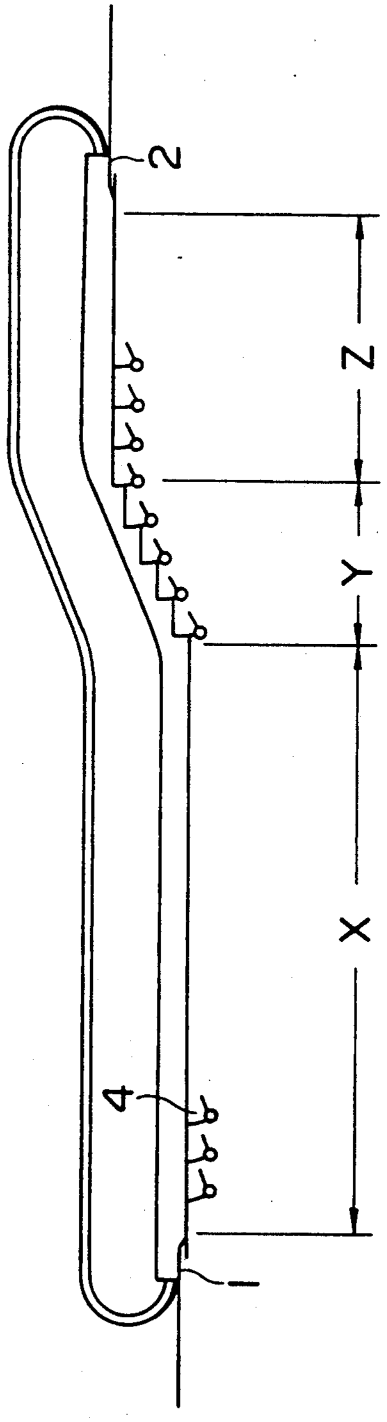
FIG. 15 is yet another side-elevational view of a modified passenger conveyor in accordance with the present invention.

Although the above embodiments are directed to the escalators of the type having the horizontal path B between the inclined paths A and C, the present invention is also applicable to an escalator or a moving walkway (FIG. 15) in which an inclined path Y is disposed between horizontal paths X and Z. In this case, the above-mentioned means for changing the passenger's sense of touch is provided at each of those portions of the horizontal paths X and Z adjacent to the inclined path Y.

In the present invention, although the horizontal path is continuous with the inclined paths, the present invention does not cover horizontal paths of the upper and lower entrance and exit (or exit and entrance) continuous respectively with one of the ends of the inclined paths.

In the passenger conveyor of the present invention provided with the horizontal and inclined paths disposed between the entrance and the exit, the change of the direction of movement of the treadboards can be foretold to the passenger. Therefore, the passenger refrains from making unnecessary movement, and can shift to the proper position, and hence an accident such as the falling-down can be prevented, thus providing improved safety.

What is claimed is:

1. A passenger conveyor comprising:
- a plurality of treadboards interconnected in an endless manner;
- means for defining at least one horizontal path along which said treadboards are moved in a horizontal direction;
- means for defining at least one inclined path continuous with said at least one horizontal path, said treadboards being movable along said inclined path in an inclined direction, and said horizontal path and said inclined path being disposed between an entrance and an exit of said conveyor;
- a pair of handrails mounted along a direction of movement of said treadboards;
- a pair of balustrade panels respectively supporting said handrails;
- an inner deck cover provided inwardly of each of said balustrade panels; and
- means, provided before said treadboards are moved form said horizontal path to said inclined path, for providing a tactile signal to the passenger of a change of moving direction of the conveyor from the horizontal path to the inclined path.

2. A passenger conveyor according to claim 1, wherein the tactile signal providing means comprises means provided before said treadboards are moved form said horizontal path to said inclined path for providing a change of height between said treadboard and said handrails.

3. A passenger conveyor according to claim 1, wherein the tactile signal providing means comprises means provided before said treadboards are moved form said horizontal path to said inclined path for providing a change of height between said treadboard and said handrails.

4. A passenger conveyor according to claim 1, wherein the tactile signal providing means comprises means provided before said treadboards are moved form said horizontal path to said inclined path for providing a change of height between said treadboard and said inner deck cover in a direction of movement of said treadboard.

5. A passenger conveyor according to claim 1, wherein a width between said inner deck covers at said horizontal path differs from a width between said inner deck covers at said inclined path. in a direction of said treadboard so as to provide said tactile signal.

6. A passenger conveyor according to claim 1, wherein a level difference is provided between adjacent treadboards at said horizontal path so as to provide said tactile signal.

7. A passenger conveyor according to claim 1, wherein said treadboard is inclined at said horizontal path so as to provide said tactile signal.

8. A passenger conveyor according to claim 1, wherein another inclined path is provided between said horizontal path and said first-mentioned inclined path, an inclination angle of said another inclined path is less than an inclination angle of said first-mentioned inclined path so as to provide said tactile signal.

9. A passenger conveyor according to claim 1, wherein said means for providing a tactile signal includes means for moving said handrails generally vertically.

10. A passenger conveyor comprising:
- a plurality of treadboards interconnected in an endless manner;
- means for defining at least one horizontal path along which said treadboards are moved in a horizontal direction;
- means for defining at least one inclined path continuous with said at least one horizontal path, said treadboards being movable along said inclined path in an inclined direction, and said horizontal path and said inclined path being disposed between an entrance and an exit of said passenger conveyor; and
- means for transmitting a change of a direction of movement of said treadboard to the passenger by application of a pressure to a body of said passenger prior to a change in a direction of movement of said treadboards changed from said horizontal inclined paths.

11. A passenger conveyor comprising:
- a plurality of treadboards interconnected in an endless manner;
- means for defining at least one horizontal path along which said treadboards are moved in a horizontal direction;
- means for defining at least one inclined path continuous with said one horizontal path, said treadboards being movable along said inclined path in an inclined direction, said horizontal path and said inclined path being disposed between an entrance and an exit of said conveyor; and
- means for informing the passenger of an occurrence of a level difference between adjacent treadboards by application of a pressure to a foot of the passenger while the passenger is moving on said horizontal path.

12. A passenger conveyor comprising:
- a plurality of treadboards interconnected in an endless manner;
- means for defining at least one horizontal path along which said treadboards are moved in a horizontal direction;
- means for defining at least one inclined path continuous with said one horizontal path, said treadboards being movable along said inclined path in an inclined direction, said horizontal path and said inclined path being disposed between an entrance and an exit of said conveyor; and
- means for informing the passenger of an occurrence of a level change between adjacent treadboards by application of a stimulus to a hand of the passenger while the passenger is moving on said horizontal path.

13. A passenger conveyor comprising:
- a plurality of treadboards interconnected in an endless manner;

means for defining at least one horizontal path along which said treadboards are moved in a horizontal direction;

means for defining at least one inclined path continuous with said one horizontal path, said treadboards being movable along said inclined path in an inclined direction, and said horizontal path and said inclined path being disposed between an entrance and an exit of said conveyor; and means for preventing the passenger from standing astride a boundary between adjacent treadboards before said adjacent treadboards reach said inclined path.

14. Treadboards for a passenger conveyor comprising at least one horizontal path and at least one inclined path connected with said at least one horizontal path, said treadboards being movable along said horizontal and said inclined path, wherein at least one tactile member is mounted on each of said treadboards in a vicinity of a boundary to an adjacent trailing treadboards, said at least one tactile member projecting beyond a tread surface of said treadboard when said treadboard approaches said inclined path so as to apprise a passenger of a change to and from the horizontal and inclined paths.

15. Treadboards for a passenger conveyor comprising at least one horizontal path and at least one inclined path connected with said at least one horizontal path, said treadboards being movable along said horizontal and said inclined path, wherein at least one tactile member is mounted on each of said treadboards in a vicinity of a boundary to an adjacent trailing treadboards for apprising a passenger of a change to and from the horizontal and inclined paths, and wherein means are provided for driving said tactile member so as to project beyond the tread surface of said treadboard when said treadboard approaches said inclined path.

16. A method of manufacturing a passenger conveyor comprising at least one horizontal path in which a plurality of treadboards are interconnected in an endless manner and are moved in a horizontal direction and at least one inclined path in which said plurality of treadboards re moved in an inclined direction, said method comprising the steps of:

forming a unit including said horizontal path and end portions of said inclined paths connected to said horizontal path or including said inclined path and end portions of said horizontal paths connected to said inclined path, providing, on said unit, means for transmitting a change of direction of the movement of said treadboards to a passenger by providing a tactile signal to the passenger prior to of a change of a moving direction to and from the horizontal and the inclined paths and connecting said unit to remaining parts of said passenger conveyor.

17. A passenger conveyor comprising:

a plurality of treadboards interconnected in an endless manner;

means for defining at least one horizontal path along which said treadboards are moved in a horizontal direction;

means for defining at least one inclined path along which said treadboards are move din an inclined direction, said at least one inclined path being continuous with said at least one horizontal path; and means, provided before said treadboards are moved form said horizontal path to said inclined path, for providing a tactile signal of a change of moving direction of said treadboards from the horizontal path to the inclined path.

* * * * *